United States Patent [19]

Wetzel

[11] 4,213,115

[45] Jul. 15, 1980

[54] VISUAL WARNING SIGNAL FOR A LOCOMOTIVE

[76] Inventor: Donald C. Wetzel, 63 Jacqueline Dr., Berea, Ohio 44017

[21] Appl. No.: 885,310

[22] Filed: Mar. 10, 1978

[51] Int. Cl.² .................... B61L 5/00; G08B 7/00; B60Q 1/26
[52] U.S. Cl. .................................. 340/47; 340/75; 340/371; 340/404; 362/84
[58] Field of Search .......... 340/47, 50, 88, 25, 340/326, 366 F, 371, 75, 377, 31, 84, 404; 362/84, 61, 80, 62

[56] References Cited

U.S. PATENT DOCUMENTS

| | | | |
|---|---|---|---|
| 1,313,622 | 8/1919 | Dodds | 362/84 |
| 2,567,425 | 9/1951 | Dillon | 362/80 |
| 3,113,293 | 12/1963 | Breese et al. | 340/50 |
| 3,696,238 | 10/1972 | Szymanski | 362/61 |
| 3,731,082 | 5/1973 | Blaylock | 340/25 |
| 3,891,986 | 6/1975 | Lipe et al. | 340/371 |
| 4,011,541 | 3/1977 | Fabry et al. | 362/62 |
| 4,090,685 | 5/1978 | Pappas | 340/47 |
| 4,108,405 | 8/1978 | Gibson | 340/47 |

*Primary Examiner*—Donald J. Yusko
*Attorney, Agent, or Firm*—Pearne, Gordon, Sessions, McCoy & Granger

[57] ABSTRACT

A visual warning system for a locomotive is disclosed which includes a signal unit mounted on the locomotive and connected by sensing means to an audible warning device on the locomotive, such as a horn. The visual warning signal unit is thus actuated whenever the horn is sounded. The signal unit comprises a stroboscopic-type lamp assembly and flashing circuitry with a coating of phosphorescent material surrounding the lamp to extend the perceived duration of each flash of the lamp. The system may also include a delay for maintaining the flashing of the visual warning signal unit after the horn has been deactuated.

11 Claims, 13 Drawing Figures

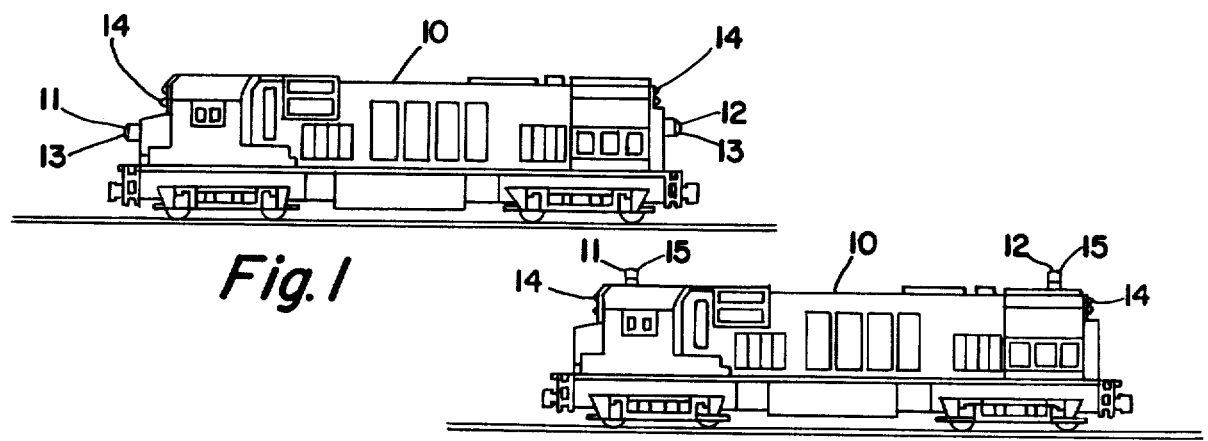
Fig. 1
Fig. 2
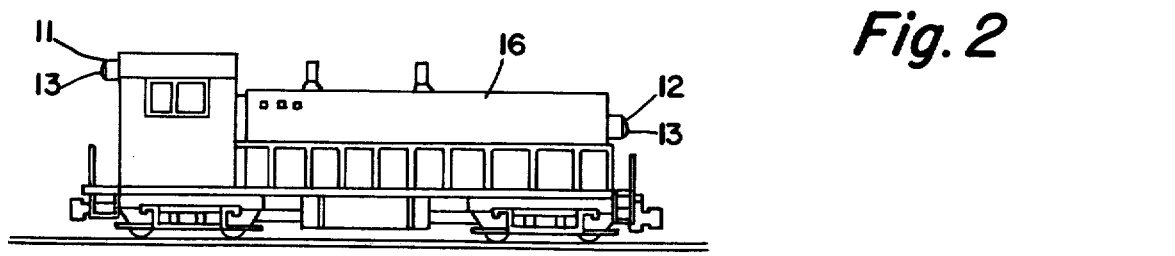
Fig. 3
Fig. 4
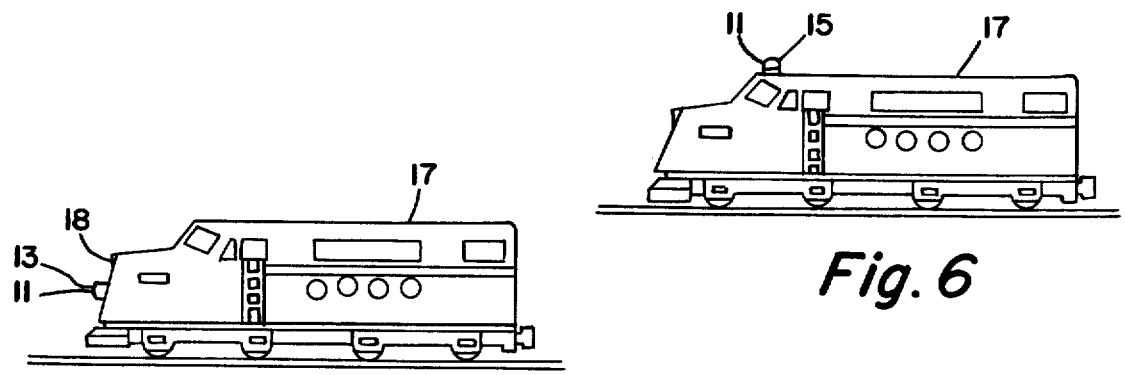
Fig. 5
Fig. 6

VISUAL WARNING SIGNAL FOR A LOCOMOTIVE

BACKGROUND OF THE INVENTION

1. Field of the invention

This invention relates to warning signals, and particularly signals for use on railroad locomotives.

2. Description of the Prior Art

To warn pedestrian and vehicular traffic of the approach of a locomotive at a railroad grade crossing, safety regulations have been established with respect to the operation of the locomotive. Present laws require the train operator or engineer when approaching a crossing to illuminate the locomotive headlamp, to ring the bell, and to sound the horn or whistle in a prescribed form. To further warn crossing traffic, road crossings also often have on-site protective devices such as crossarms, stop lights, red signal lamps, and gates. The effectiveness of these warning devices is vital, since heavy freight or passenger trains traveling at track speed usually cannot be brought to a stop in time to avoid a collision with a vehicle or person who has not observed the existing signals and warnings.

In many cases, the existing warning signals are inadequate. Statistics published by the U.S. Government, Department of Transportation, Federal Railroad Administration show that approximately 1500 to 1800 people are killed and between 3800 and 4000 are injured each year at railroad grade crossings. These accident rates have remained fairly constant over the last few years while train traffic has declined and vehicular traffic has increased.

In an attempt to provide pedestrian and vehicular traffic with a better warning of the approach of a locomotive, additional signal lights have heretofore been placed on locomotives. Typically, such warning lights mounted on the front of locomotives have included mechanical apparatus for providing lateral movement to the lights or to oscillate the lights to increase the effect of the warning signal. However, it has been inherently expensive to manufacture such devices because of the intricate relationship between the various components and the need for a motorized source of power to drive the apparatus which moves the light in the desired pattern. In addition, the various components required precise assembly and adjustment to assure that the desired pattern of the light beam would be established at the proper range and position in the path of the locomotive.

More recently, the mechanized devices have been replaced by electronic circuitry which turns the warning lights on and off. Examples of such electronic systems are shown in U.S. Pat. No. 3,113,293 issued to R. F. Breese et al., and U.S. Pat. No. 3,908,179 issued to A. C. Heehler et al. The electronic circuitry in these devices, however, comprised simple on-off devices which alternately supply power to the light and deactuate the light to produce a flashing effect.

With all of the prior art visual warning signals for locomotives, the effectiveness of the signal has been limited by the brightness of the lamp. With mechanically or electrically oscillating signals, the distance over which the signal was effective has depended upon the relative strength of the lamp, and this, in turn, has been limited by the amount of power supplied to the lamp by the locomotive electrical system. An extremely bright lamp has been impractical since it would produce an extremely large drain on a locomotive electrical power supply.

In addition any such warning signal is, of course, completely ineffective if it is not used. The continual flashing of a warning light on the locomotive is extremely distracting to the locomotive operator or engineer. Therefore, any such signal must be actuated each time the locomotive approaches a grade crossing. However, if the operator or engineer neglects to actuate the signal, any benefit of such a signal is lost.

SUMMARY OF THE INVENTION

The disadvantages and shortcomings of the prior art are overcome by the visual warning signal for locomotives of the present invention.

It is among the objects of this invention to provide a visual warning system for a locomotive which is connected to an audible warning device on the locomotive, such as the horn, whereby the visual warning system is automatically actuated when the horn is sounded by the locomotive operator or engineer, as is required whenever the locomotive approaches a grade crossing, so that the operator or engineer is not required to selectively actuate the visual warning signal and so that the signal does not continually flash to the distraction of the operator.

Another object of this invention is to provide a high intensity stroboscopic-type lamp assembly for use in a visual warning system on a locomotive to greatly increase the effective distance of the warning signal over that possible by conventional lamps having simple electronic on-off oscillating or triggering circuitry.

Another object is to provide a stroboscopic-type visual warning signal unit for a locomotive in which the unit includes a coating of phosphorescent material on a portion of the housing around the lamp, the phosphorescent coating effectively extending the perceived duration of each flash of the stroboscopic-type lamp.

These and other objects are accomplished by the locomotive visual warning system of the present invention which includes a signal unit mounted on the locomotive. The visual warning signal unit includes a stroboscopic-type lamp and associated flashing circuitry. Means for triggering the signal unit are connected to sensing means on an actuatable audible warning device on the locomotive, such as a horn. The visual warning signal unit begins flashing whenever the audible warning device sounds. The system may also include delay means for maintaining the flashing of the visual warning signal unit after deactuation of the audible warning device. Preferably, the signal unit also has a coating of phosphorescent material surrounding the lamp. The system may also include switch means connected to the locomotive power supply and the visual warning signal unit for actuating the visual signal independently of the actuation of the audible warning device.

BRIEF DESCRIPTION OF THE DRAWINGS

FIGS. 1 through 6 are side elevational views of conventional locomotives showing placement of the visual warning signal units of the present invention.

DETAILED DESCRIPTION OF THE PREFERRED EMBODIMENTS

Figure 8:
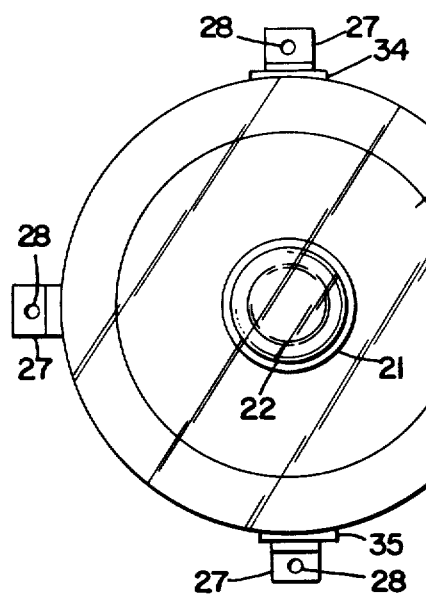
FIG. 8 is a top plan view of the unit of FIG. 7.

Referring more particularly to the drawings and initially to FIGS. 1–6, there are shown conventional railroad locomotives having the visual warning system of the present invention. A general purpose locomotive 10 (FIGS. 1,2) which is capable of running in either direction may have visual warning signal units at both ends of the locomotive, a unit 11 mounted at the front end and a unit 12 mounted at the rear end. Each unit 11 or 12 may be either a unidirectional signal unit 13 (FIG. 1) mounted on the end of the locomotive directly below the headlamp 14, or a multidirectional unit 15 (FIG. 2) mounted on top of the locomotive near the end. For a switcher locomotive 16, as shown in FIGS. 3 and 4, a front signal unit 11 and a rear signal unit 12 may also be provided. The units 11 and 12 may be unidirectional units 13 (FIG. 3) installed on each end of the locomotive or multidirectional units 15 mounted on top at each end of the locomotive.

Sometimes it may not be necessary to install signal units at both ends of the locomotive. Many locomotives operate predominantly in one direction, such as the traditional "covered wagon" locomotive 17 shown in FIGS. 5 and 6. The locomotive 17 has a single front visual warning signal unit 11 which may be either a unidirectional unit 13 (FIG. 5) located on the front of the locomotive directly below the headlamp 18 or a multidirectional unit 15 (FIG. 6) located on top of the locomotive near its forward end. With locomotives which operate in both directions, a single multidirection unit may be mounted on top in the middle of the locomotive.

Figure 7:
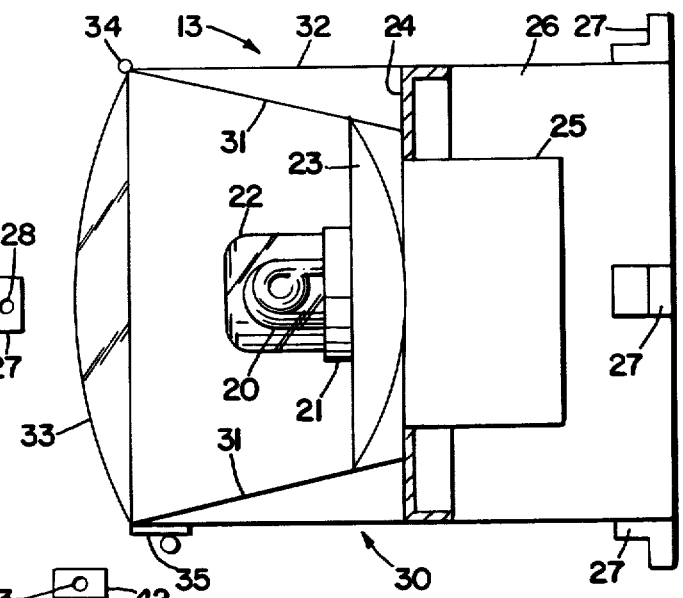
FIG. 7 is a side elevational view of one form of the visual warning signal unit of the present invention.

The unidirectional unit 13 is shown in greater detail in FIGS. 7 and 8. The unit comprises a stroboscopic-type flash lamp 20 mounted in a base 21 having a standard octal socket and covered with a protective glass cover 22. The lamp 20 is typically a flash tube filled with xenon or other inert gas such as argon or krypton. To direct the light produced by the lamp 20 toward the direction of travel, a parabolic reflector 23 is mounted behind the base 21. The base 21 and reflector 23 are mounted on a circular lamp assembly support 24 to which is attached a cylindrical casing 25 containing the stroboscopic-type flashing circuitry. The flashing circuitry in the casing 25 is connected by wires or cables (not shown) to the locomotive electrical supply circuitry as hereinafter described. The support 24 is mounted over a heavy metal cylindrical base 26 which may be of cast aluminum or rolled steel. The base 26 is attached to the end of the locomotive by L-shaped mounting ears 27 having holes 28 for the insertion of fasteners.

The assembly comprising the lamp 20 and reflector 23 is mounted in a housing 30 which extends from the casing 26 and surrounds the lamp cover 22 and reflector 23. The housing 30 comprises a frusto-conical interior surface 31 which is coated with a phosphorescent material as hereinafter explained, and a cylindrical outer surface of the base 26. The housing 30 is covered by a clear plastic convex lens 33 mounted over the open forward end of the housing 30 to protect the interior of the housing from damage by weather while permitting the exit of light from the lamp 20. The lens 33 is mounted on a hinge 34 to permit the lens 33 to be opened to gain access to the interior of the housing 30 such as when necessary for changing the lamp 20. The lens 33 is held in the closed position by a clasp 35.

The stroboscopic-type flash lamp 20 and the associated flashing circuitry are otherwise conventional and well-known, and are widely used for photographic, stroboscopic and like purposes. The known flashing circuitry essentially comprises a capacitor arranged to be charged by the power supply and to be subsequently discharged through the flash tube to result in a short or instantaneous ionic discharge current through the tube of high peak value, accompanied by a flash of high instantaneous light intensity.

Due to the extremely short duration of the flash produced by the lamp, the interior surface 31 of the housing 30 is coated with a phosphorescent paint or other similar material. When the lamp 20 flashes, the phosphorescent coating on the interior surface 31 absorbs a portion of the light produced by the lamp and then slowly emits this light after the lamp has darkened. The coating effectively increases the perceived duration of the flash and thus make the warning light more effective.

Figure 10:
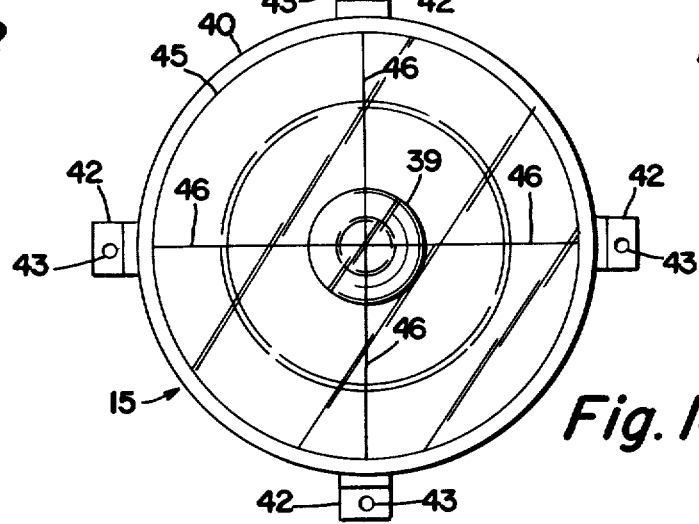
FIG. 10 is a top plan view of the unit of FIG. 9.
Figure 9:
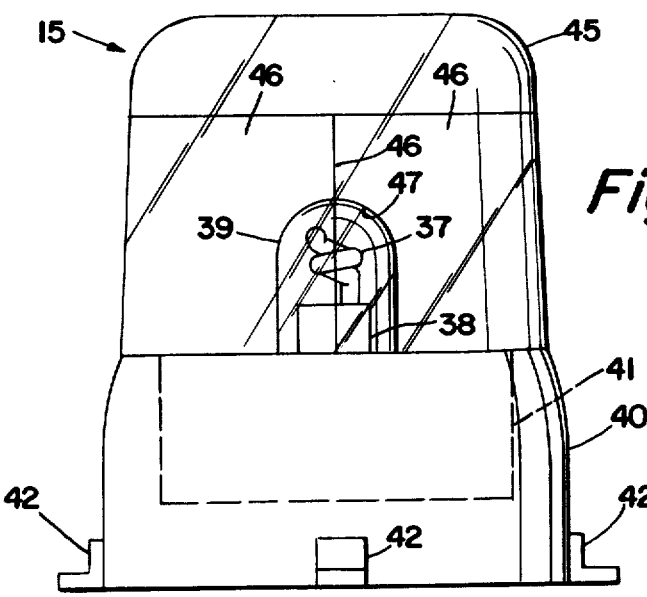
FIG. 9 is a side elevational view of another form of the visual warning signal unit of the present invention.

An alternative design for the unidirectional signal unit 13 is the unit 15 shown in FIGS. 9 and 10 which is capable of displaying a visual warning in all directions. The multidirectional unit 15 comprises a stroboscopic-type lamp 37, typically a xenon flash tube, mounted in a base 38 having a standard octal socket and protected by a glass cover 39. The base 38 and cover 39 are mounted on a generally cylindrical base 40 which contains a casing 41 containing the stroboscopic-type flashing circuitry. At its lower end, the base 40 has a plurality of L-shaped mounting ears 42 having holes 43 to allow the unit to be mounted on the top of a locomotive by appropriate fasteners.

Extending upwardly from the base 41 is a clear plastic dome 45, typically of Lexan polycarbonate resin material. To permit changing of the lamp 37 if necessary, the dome 45 is removably attached to the base 41, such as by mechanical engagement of the lower rim of the dome into a corresponding groove in the upper portion of the base. The interior of the dome 45 is divided into quadrants by reflecting partitions 46 which extend perpendicularly to each other as shown in FIG. 10. The partitions 46 have a central U-shaped recess 47 to provide clearance for the lamp cover 39. Each side of each of the partitions 46 is coated with phosphorescent paint or other phosphorescent material similarly to the coating of the interior surface 31 of the housing 30 of the unidirectional warning unit 13.

To permit either form of signal unit to be automatically actuated as the locomotive approaches a grade crossing, the visual warning system of this invention includes means attached to the locomotive horn, bell, whistle, or other audible warning device to actuate the visual signal unit whenever the audible warning unit is actuated, since an audible signal is generally always sounded as the locomotive approaches the crossing. Most locomotives use as an audible warning device a horn, such as the horn 50 shown in FIG. 8. The typical horn 50 is connected to a conduit 51 leading from the locomotive air supply, which is typically 140 psi, through a horn actuating valve 52. The valve 52 has control means 53 for actuation of the valve and thus for actuation of the horn by the locomotive operator or engineer. Between the valve 52 and the locomotive horn 50, the present invention provides T-fitting 54. An electrical pneumatically operated pressure switch 55 is connected to the T-fitting 54. When the valve 52 is actuated using the control means 53 and air is supplied to the horn 50, the pressure switch 55 is actuated by the increase in air pressure through the T-fitting 54.

Figure 12:
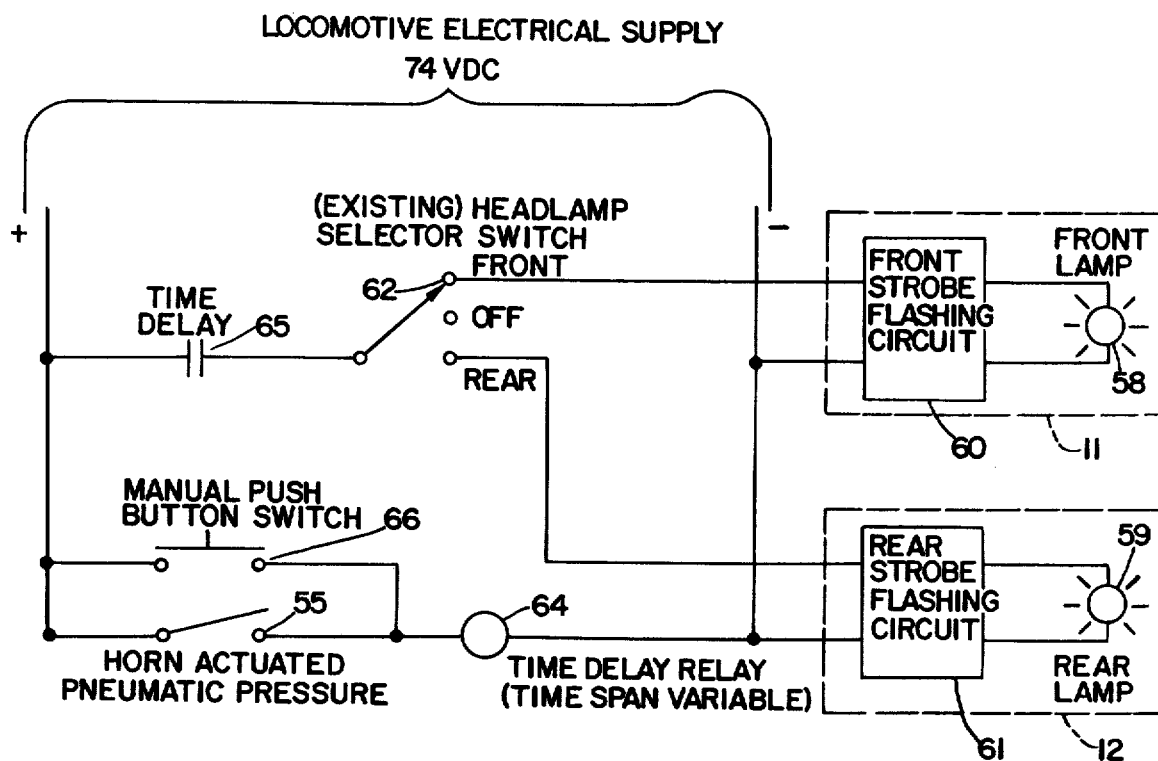
FIG. 12 is an electrical schematic diagram of the visual warning system of the present invention.

The connection of the pressure switch 55 in the actuating means for the visual warning unit is shown in the electrical schematic diagram of FIG. 12. The visual warning system of the present invention is powered by the locomotive electrical supply 57 which is typically 74 volts DC. The visual warning system may comprise a front visual warning signal unit 11 and a rear unit 12, each having its respective lamps 58 and 59 and associated stroboscopic-type flashing circuitry 60 and 61. Each of the signal units 11 and 12 may be either unidirectional units, such as unit 13, or multidirectional units, such as unit 15, mounted either on or near the front and the rear of locomotive, as shown in FIGS. 1–4. One terminal from each of the flashing circuitries 60 and 61 is connected directly to the negative side of the locomotive electrical supply 57. The other terminal from each of the flashing circuitries 60 and 61 is connected to the locomotive headlamp selector switch 62. Standard railroad safety regulations require the headlamp to be illuminated as the locomotive approaches the crossing. The switch 62 which is existent in conventional locomotive electrical systems is used to select which of the front or rear locomotive headlamps, such as headlamps 14 in FIGS. 1 and 2, are actuated depending on the direction of travel of the locomotive. If the forward direction of the locomotive is toward the front of the unit, the front headlamp is selected by the operator at the switch 62, and the front unit flashing circuitry 60 is connected to the positive side of the locomotive electrical supply 57 through the switch 62, so that the front mounted signal lamp 58 flashes when the horn sounds. Alternatively, if the locomotive is traveling in the opposite direction, the rear headlamp would be selected on the switch 62 actuating the rear warning unit 12.

The horn actuated switch 55 is connected across the electrical supply 57 in series with a time delay relay 64. The relay 64 operates a contact 65 connected between the headlamp selector switch 62 and the positive side of the locomotive electrical supply 57. The time delay produced by the relay 64 is adjustable and begins as soon as switch 55 opens. Thus when switch 55 closes, the time delay relay 64 is energized to close the contact 65, and after the switch 55 opens, the contact remains closed for an adjustably set predetermined period of time, so that the visual warning unit 11 or 12 selected by the switch 62 remains activated for a sufficient period of time after the horn has been sounded to give an adequate visual warning to pedestrians and the operators of vehicles at the crossing to which the locomotive is approaching.

The stroboscopic-type flash lamp may have a luminous intensity of as much as 12,000,000 candle power in the ultraviolet and visual region of the spectrum. Because, however, the signal unit uses a stroboscopic-type flashing circuit, the unit when actuated requires only approximately 1.9 amperes of current from the 74 volt DC locomotive electrical supply. This added 1.9 ampere load is insignificant and can be assumed by the headlamp circuit with no difficulty.

If desired, a manual push button switch 66 may be provided parallel to the horn actuated pneumatic pressure switch 55 to permit the visual warning system to be activated without sounding the locomotive horn. When the manual button switch 66 is closed and opened, the relay 64 is energized, closing the contact 65 for an adjustably set time.

Instead of the time delay relay 64 and contact 65, a solid state time delay device may be utilized. Both electromechanical and solid state electrical timer devices are well-known and commercially available.

In lieu of the horn actuated pneumatic pressure switch 55, a sound actuated switch could be employed. Such a switch would be located in the horn or bell area, and would close or open when a predetermined level of sound is exceeded. The sound actuation level would be selected so that the locomotive horn or bell would provide the sound needed to actuate the switch.

If only one visual warning unit is used, such as a single multidirectional unit 15 mounted in the middle of the locomotive, the connection through the headlamp selector switch 62 would be omitted so that the single warning unit would be actuated whenever either switch 55 or 66 is closed, and contact 65 is closed.

Figure 13:
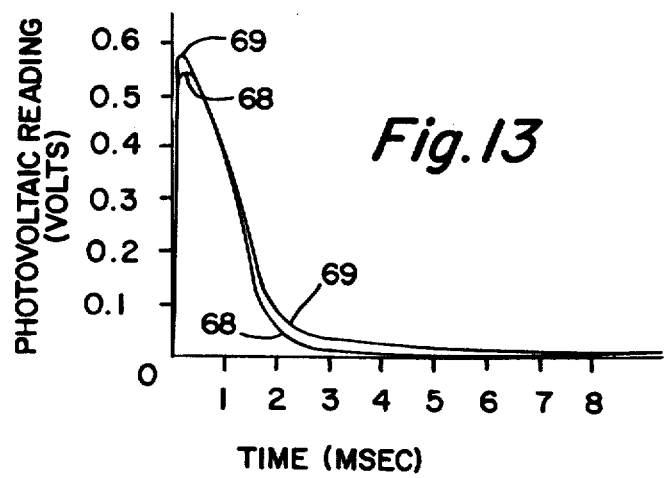
FIG. 13 is a graph showing the time of duration of the flash of the visual warning signal unit.

The effect of the phosphorescent coating on the housing interior surface 31 or the sides of the partitions 46 is graphically shown in FIG. 13. The data of FIG. 13 was recorded from oscilloscope tracings in tests in which a photovoltaic cell was connected to a visual warning unit of the present invention. The voltage output of the cell is proportional to the amount of light received by the cell. Line 68 indicates the recording of a flash from a warning unit without the phosphorescent material. The light output from the unit peaks at 0.56 to 0.575 volts and has a duration of a slightly over 3 milliseconds. Line 69 is a recording of a flash from a unit with phosphorescent material. The peak light output from this unit is just below 0.6 volts and lasts approximately 4 milliseconds. Therefore, the flash unit with phosphorescent material yields approximately a 25% increase in perceivable flash duration.

Tests using a typical stroboscopic-type flash unit and its ancillary equipment under normal operating conditions has shown such a unit to have a life expectancy exceeding 5 million flashes. At a design flash rate of about 60 flashes per minute, flash tube life expectancy is thus in excess of 1,400 operating hours.

The effect of the flashing visual warning signal of the present invention is to draw the attention to the approaching locomotive. Peripheral vision is the portion requiring stimuli by this situation since the driver or pedestrian is more intent viewing forward toward the path in which he is traveling. The human eye requires very little activation to pick up a peripheral vision image and attract the subject's attention to the source of the light. One of the strongest attractions to the peripheral vision is a flashing light such as a turn indicator or a roadside neon sign. When the image of an object, such as an intense flash, is perceived by the peripheral vision, the eyes swing involuntarily toward the flash so that the object can be perceived in detail. A flashing light of great brilliance such as approximately 12,000,000 candle power provided by this invention and with persistence is a powerful stimulus to the peripheral vision, a greater stimulus than a steady light.

While the extremely short pulse duration of the stroboscopic-type lamp is its principal advantage in stroboscopic and photographic uses, it has also proven in the past to be its main shortcoming when used as a visual warning. The human eye also possesses a phenomenon known as persistence whereupon a bright light or shape is retained in memory. Treating the inside of the housing or the partitions with a phosphorescent material greatly increases the persistence effect of the visual warning.

Figure 11:
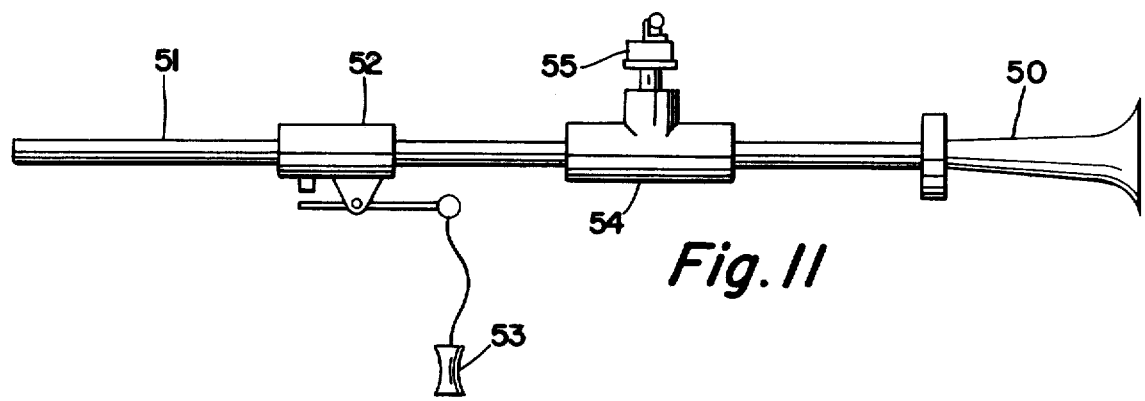
FIG. 11 is a pneumatic block diagram showing an audible warning device on the locomotive with the sensing means of the present invention.

In operation, as the locomotive approaches the grade crossing, the operator in accordance with standard safety regulations illuminates the headlamp in the direction of travel by actuating the headlight selector switch 62 and actuates the control means 53 to sound the horn in a prescribed form, usually two long, one short, finally one long peal, the last occurring as the locomotive passes over the crossing. When the horn sounds, the horn actuated pneumatic pressure switch 55 closes as it senses air being supplied to the horn 50 through the T-fitting 54 (FIG. 11). The closing of the switch 55 allows current to flow through the relay 64, closing the contact 65 (FIG. 12). After the control means 53 is released and the horn stops, the switch 55 opens, but the time delay maintains the contact 65 closed for a predetermined duration, preferably about 15 seconds. While the contact 65 is closed, power is supplied to the visual warning signal unit 11 or 12 selected by the headlamp selector switch 62 according to the direction of travel of the locomotive, or if only one unit is used, power is supplied to that visual warning unit. The lamp in the selected unit is activated and flashes, preferably at a rate of one flash per second during the 15 second period and is reactivated for 15 seconds of flashing each time the horn is sounded. In practice, with the headlamp illuminated as required by law and the horn being sounded also as required by law, each peal of the horn will automatically initiate about 15 seconds of periodic flashing by the lamp in the visual warning signal unit with automatic shut-off at the end of this period. The visual warning would commence well in advance of the approach of the locomotive to the crossing and would last until well after the locomotive has passed through the crossing. The unit thus operates automatically only when needed, and does not operate to the distraction of the operator except when the locomotive approaches a crossing.

While the invention has been shown and described with respect to specific embodiments thereof, these are intended for the purpose of illustration rather than limitation, and other modifications and variations will be apparent to those skilled in the art all within the intended scope and spirit of the invention. Accordingly, this patent is not to be limited to the specific embodiment herein shown and described nor in any other way which is inconsistent with the extent to which the progress in the art has been advanced by this invention.

What is claimed is:

1. A visual warning system for a locomotive having an audible warning device, which comprises:
   a signal unit for mounting on the locomotive, said unit having a stroboscopic-type lamp connected to a stroboscopic-type flashing circuitry, portions of said unit surrounding said lamp having a coating of phosphorescent material for extending the perceived duration of each flash of said lamp; and
   means responsive to the audible warning device on said locomotive for actuating said signal unit.

2. A visual warning system as in claim 1 comprising in addition:
   a second signal unit for mounting on the opposite end of the locomotive from which said first-mentioned signal unit is to be mounted, said second signal unit also having a stroboscopic-type lamp connected to a stroboscopic-type flashing circuit, portions of said second signal unit surrounding said lamp having a coating of phosphorescent material to extend the perceived duration of each flash of the lamp; and
   switch means connected to said actuating means and to both said first and second signal units for selecting which of said signal units is actuated by said actuating means.

3. A visual warning system as in claim 1 comprising in addition switch means for actuating said signal unit independently of the actuation of said audible warning device.

4. A visual warning system for a locomotive having an actuatable audible warning device, which system comprises:
   pressure-responsive means for sensing the operation of said audible warning device;
   a signal unit for mounting on the locomotive;
   means connected to said sensing means for triggering said signal unit whereby said signal unit is actuated whenever said audible warning device is in operation; and
   delay means for maintaining the actuation of said signal unit after operation of said audible warning device.

5. A visual warning system as in claim 4 wherein said signal unit includes a stroboscopic-type lamp and flashing circuitry.

6. A visual working system as in claim 5 wherein portions of the signal unit surrounding said lamp have a coating of phosphorescent material for extending the perceived duration of the flashing of said lamp.

7. A visual warning system as in claim 4 comprising in addition:
   a second signal unit for mounting on the opposite end of the locomotive from which said first-mentioned signal unit is to be mounted; and
   switch means connected to said triggering means and to both said first and second signal units for selecting which of said signal units is actuated by said triggering means when said audible signal device is actuated.

8. A visual warning system for a locomotive having a headlamp selector switch as in claim 7 wherein said switch means is adapted to be operatively connected to said selector switch.

9. A visual warning system as in claim 4 comprising in addition switch means connected to said signal unit for triggering said signal unit independently of the actuation of said audible warning device.

10. A visual warning system as in claim 4 wherein said delay means includes a time delay relay and relay-operated contact operatively connected to said triggering means.

11. A warning system for a vehicle such as a locomotive which comprises:
   a power supply;
   an audible warning device;
   actuating means for said audible warning device;
   sensing means connected to said audible warning device;

a pair of headlamps mounted at opposite ends of the locomotive;

a headlamp selector switch means for actuating one of said pair of headlamps;

a pair of signal units mounted at opposite ends of the locomotive, each of said units having a stroboscopic-type flashing circuitry, portions of each unit surrounding said lamp having a coating of phosphorescent material for effectively extending the perceived duration of each flash of said lamp;

selecting means associated with said headlamp selector switch for operatively connecting one of said pair of signal units to said power supply when its respective headlamp is actuated;

triggering means operatively connected to said sensing means for triggering one of said signal units connected by said selecting means to said power supply, whereby a signal unit is actuated whenever said headlamp is illuminated and said audible warning device is actuated;

delay means associated with said triggering means for maintaining the actuation of one of said signal units after deactuation of said audible signal device; and switch means connected to said power supply and to said signal units for actuating one of said signal units connected by said selecting means to said power supply independently of the actuation of said audible warning device.

* * * * *